United States Patent [19]
Aono et al.

[11] Patent Number: 5,278,781
[45] Date of Patent: Jan. 11, 1994

[54] DIGITAL SIGNAL PROCESSING SYSTEM

[75] Inventors: Kunitoshi Aono, Hirakata; Masaki Toyokura, Neyagawa; Shiro Sakiyama, Moriguchi; Toshiyuki Araki, Yawata; Masakatsu Maruyama, Hirakata, all of Japan

[73] Assignee: Matsushita Electric Industrial Co., Ltd., Osaka, Japan

[21] Appl. No.: 51,273

[22] Filed: Apr. 23, 1993

Related U.S. Application Data

[63] Continuation of Ser. No. 790,001, Nov. 1, 1991, abandoned, which is a continuation of Ser. No. 272,055, Nov. 14, 1988, abandoned.

[30] Foreign Application Priority Data

| Nov. 12, 1987 | [JP] | Japan | 62-286064 |
| Feb. 5, 1988 | [JP] | Japan | 63-26094 |
| Feb. 5, 1988 | [JP] | Japan | 63-26098 |

[51] Int. Cl.$^5$ .............................. G06F 7/38
[52] U.S. Cl. ..................... 364/736; 364/725
[58] Field of Search ............ 364/725, 736, 728.01, 364/728.03, 724.12, 724.16, 750.5, 784

[56] References Cited

U.S. PATENT DOCUMENTS

| 4,489,393 | 12/1984 | Kawahara et al. | 364/750.5 |
| 4,627,026 | 12/1986 | Di Giogno | 364/736 |
| 4,644,491 | 2/1987 | Ookawa et al. | 364/784 |
| 4,694,416 | 9/1987 | Wheeler et al. | 364/736 |
| 4,720,780 | 1/1988 | Dolecek | 364/736 |
| 4,752,905 | 6/1988 | Nakagawa et al. | 364/784 |
| 4,831,577 | 5/1989 | Wei et al. | 364/784 |
| 4,876,660 | 10/1989 | Owen et al. | 364/750.5 |
| 4,922,418 | 5/1990 | Dolecek | 364/736 |
| 4,958,312 | 9/1990 | Ang et al. | 364/736 X |
| 5,119,324 | 6/1992 | Ahsan | 364/736 |

FOREIGN PATENT DOCUMENTS 2115192 9/1983 United Kingdom ........... 364/728.03

OTHER PUBLICATIONS

Kung, *IEEE Proceedings International Conference on Pattern Recognition*, "Systolic Algorithms for the CMU WARP Processor", pp. 570–577 1984.

*Primary Examiner*—Tan V. Mai
*Attorney, Agent, or Firm*—Wenderoth, Lind & Ponack

[57] ABSTRACT

A digital signal processing system includes a plurality of multiplier/accumulators for executing a pipeline processing operation. Each of the plurality of multiplier/accumulators includes a multiplication part and an addition part. The multiplication parts includes N pipeline registers for storing N intermediate outputs of a multiplier. The addition part includes a Wallace tree transformation unit for transforming a sum of N+1 inputs into two transformation outputs, and an adder for adding the two transformation outputs. The N+1 inputs includes the N intermediate outputs from the multiplication part and the one addition output from the adder.

4 Claims, 5 Drawing Sheets ary object of this invention to pres-

DIGITAL SIGNAL PROCESSING SYSTEM

This application is a Continuation of now abandoned application, Ser. No. 07/790,001, filed Nov. 1, 1991 which was a Continuation of now abandoned application Ser. No. 07/272,055, filed Nov. 14, 1988.

BACKGROUND OF THE INVENTION

1. Field of the Invention

This invention relates to a digital signal processing system for compressing a video signal by employing an orthogonal transform, especially a discrete cosine transform (DCT), and filtering.

2. Description of the Related Art

A video signal, as compared with an audio signal, is about 1000 times wider in the bandwidth, and has a sampling frequency that may sometimes reach the megahertz range. Additionally, the video signal has a two-dimensional data structure, and its quantity of data is enormous. Accordingly, a high speed operation is required, particularly in the digital image signal processing system.

As examples, the transversal filter and DCT widely employed in image signal processing are briefly explained below.

In image signal processing, a transversal filter as expressed in formula (1) is widely employed.

$$G(x) = \sum_{i}^{n} W_i \cdot F(x + i) \quad (1)$$

where  $F(x)$: input
  $G(x)$: output
  $W_i$: weighting coefficient
  $n$: number of taps This is generally known as convolution. To realize this filter in real time by using only 9 taps, 9 multiplication operations and 8 addition operations are required within one sampling period of the video signal. Assuming the sampling period to be 100 ns, very fast multipliers and adders are therefore needed.

Formula (1) relates to a one-dimensional filter. In the case of a two-dimensional filter, the formula becomes as shown in equation (2) below, in which a much faster operation speed is demanded as the quantity of the data to be handled is increased.

$$G(x,y) = \sum_{i}^{n} \sum_{j}^{m} W_{ij} \cdot F(x + i, y + j) \quad (2)$$

where  $F(x,y)$: input
  $G(x,y)$: output
  $W_{ij}$: weighting coefficient
  $n,m$: number of taps On the other hand, the one-dimensional DCT is generally expressed as formula (3) below.

$$FK = \frac{2}{N} \sum_{n=0}^{N-1} UK \cdot fn \cdot \cos((2n + 1)k\pi/2N) \quad (3)$$

$(K = 0,1,2, \ldots, N - 1)$
$UK = \frac{1}{2}(K + 0)$
$UK = 1(k = 1,2, \ldots, N - 1)$ where  $fn$: input
  $FK$: output
  $N$: degree Supposing $N=4$, formula (3) may be rewritten into the following matrix formula.

$$[f_0, f_1, f_2, f_3] \begin{matrix} W_{00} \ldots \ldots \ldots W_{03} \\ \ldots \ldots \ldots \ldots \\ W_{30} \ldots \ldots \ldots W_{33} \end{matrix} = [F_0, F_1, F_2, F_3]$$

If, for example, the data size is 8 pixels, in order to realize the one-dimensional DCT in real time, the direct calculation method by matrix operation requires 64 multiplication operations and 56 addition operations while data of 8 pixels are being entered.

The two-dimensional DCT can be realized by applying the one-dimensional DCT repeatedly in the lateral and vertical directions, but, a much faster operation speed is also needed.

Recently, various high speed devices for image signal processing have been disclosed. In using these devices, however, it is considerably difficult to realize the digital image signal processing in real time as stated hereabove. Additionally, to enhance the speed of the digital image signal processing, an exclusive system with a pipeline structure is often used, but it is likely to be functionally limited and very expensive.

SUMMARY OF THE INVENTION

It is hence a primary object of this invention to present a high-speed digital signal processing system with plural operators, by pipelining, which is capable of adapting to various applications efficiently by changing data paths between parallel operators.

To achieve the above object, the digital signal processing system of this invention includes a plurality of multipliers/accumulators (MACS) for weighting the data using the multiplier by a coefficient stored in a memory and accumulating the output of the multipliers with the accumulators so as to perform a parallel operation by pipelining. The accumulator includes an adder, a register and a first selector. The output of the multiplier in the same multiplier/accumulator is entered to one of the inputs of the adder, while the other input of the adder is selectively coupled to either the output of the register at the accumulator in the same multiplier/accumulator or the output of the register in a pre-stage multiplier/accumulator through the first selector. The output of the adder is entered into the register in the same multiplier/accumulator, and it is controlled so as to change over the flow of the data in the parallel arithmetic circuits composed of plural multiplier/accumulator sets by the first selector.

In this invention, by changing over the flow of the data in parallel arithmetic circuits composed of plural multiplier/accumulator sets in the structure described herein, the construction of the pipeline operation may be reproduced. Therefore, different operations such as convolution and matrix operation are possible in one arithmetic circuit, and superhigh speed processing may be easily realized.

Moreover, in the digital signal processing system of this invention, in the multiplier/accumulator, execution of the multiplication part and execution of the addition part are of a pipeline system. The multiplication part possesses n pipeline registers for storing n execution intermediate outputs of multiplication, and the addition part is composed of a converter of a Wallace tree structure for converting the sum of (n+1) inputs of n intermediate outputs and another input to be entered in the adder into two inputs, and a two input adder, so that a high speed operation is realized.

In this digital signal processing system, furthermore, in the case of two-dimensional orthogonal transform by applying the one-dimensional orthogonal transform in the vertical direction and in the lateral direction in each unit data block, two buffer memories are used, and the intermediate data after the first one-dimensional orthogonal transform is written into one of them, and the intermediate data is read out from the other one and is entered into the second one-dimensional orthogonal transformer. In this way, each time the unit data block processing is completed, change over of the roles of the buffer memories is effected, so that the memory bus-neck of the system may be eliminated.

DETAILED DESCRIPTION OF THE INVENTION

Figure 1:
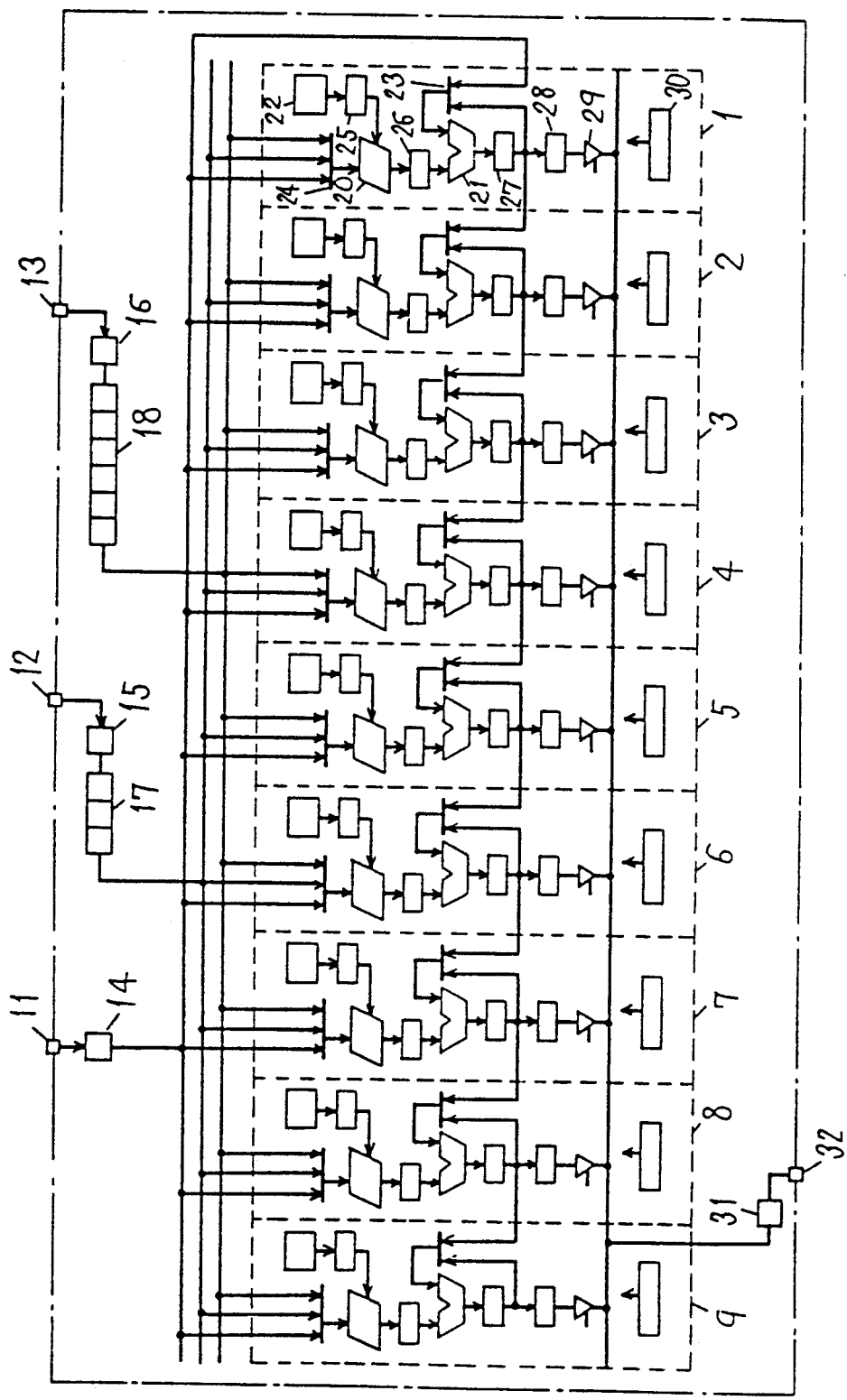
FIG. 1 is a construction block diagram of a first embodiment of a digital signal processing system of the invention.

FIG. 1 shows a block diagram of an embodiment of the digital signal processing system of this invention.

In FIG. 1, blocks 1 to 9, indicated by broken lines, denote nine multiplier/accumulator sets each having an identical structure, block 1 being disposed as the multiplier/accumulator of the lowest digit, and block 9 being disposed as the multiplier/accumulator of the highest digit.

Data is entered via three input ports 11, 12, 13 into input registers 14, 15, 16. The data entered via input port 12 is supplied to the multiplier/accumulator sets 1 to 9 through a three stage delay circuit 17, and the data entered via input port 13 is supplied similarly through a six stage delay circuit 18.

Each one of the multiplier/accumulator sets 1 to 9 is composed of a multiplier 20, and adder 21, a memory 22, selectors 23, 24, registers 25 to 28, and output circuit 29, and a control circuit 30. Data from one of the input ports 11, 12, 13 is selected by the selector 24. This input data and the coefficient stored in the memory which is supplied via the register 25, are multiplied in the multiplier 20. The output of the multiplier 20 is supplied to one input of the adder 21 through the register 26. For the multiplier/accumulators 2 to 9, at the other input of the adder 21, either the data from the register 27 within a same multiplier/accumulator or the data of the register 27 in a lower rank multiplier/accumulator is selected by the lowest rank selector 23 and entered. In the adder 21 of the lowest rank multiplier/accumulator 1 of the lowest digit, the data of the register 27 in the same multiplier/accumulator or the data entered via the input port 11 is selected by the selector 23 and entered.

The data of the register 27 in each of the multiplier/accumulators 1 to 9 is entered into the same output register 31 through the respective register 28 and output circuit 29, and is output via the output port 32.

The structure of FIG. 1 is briefly described above, and its operation is explained below with reference to the embodiments of the present invention.

Figure 2:
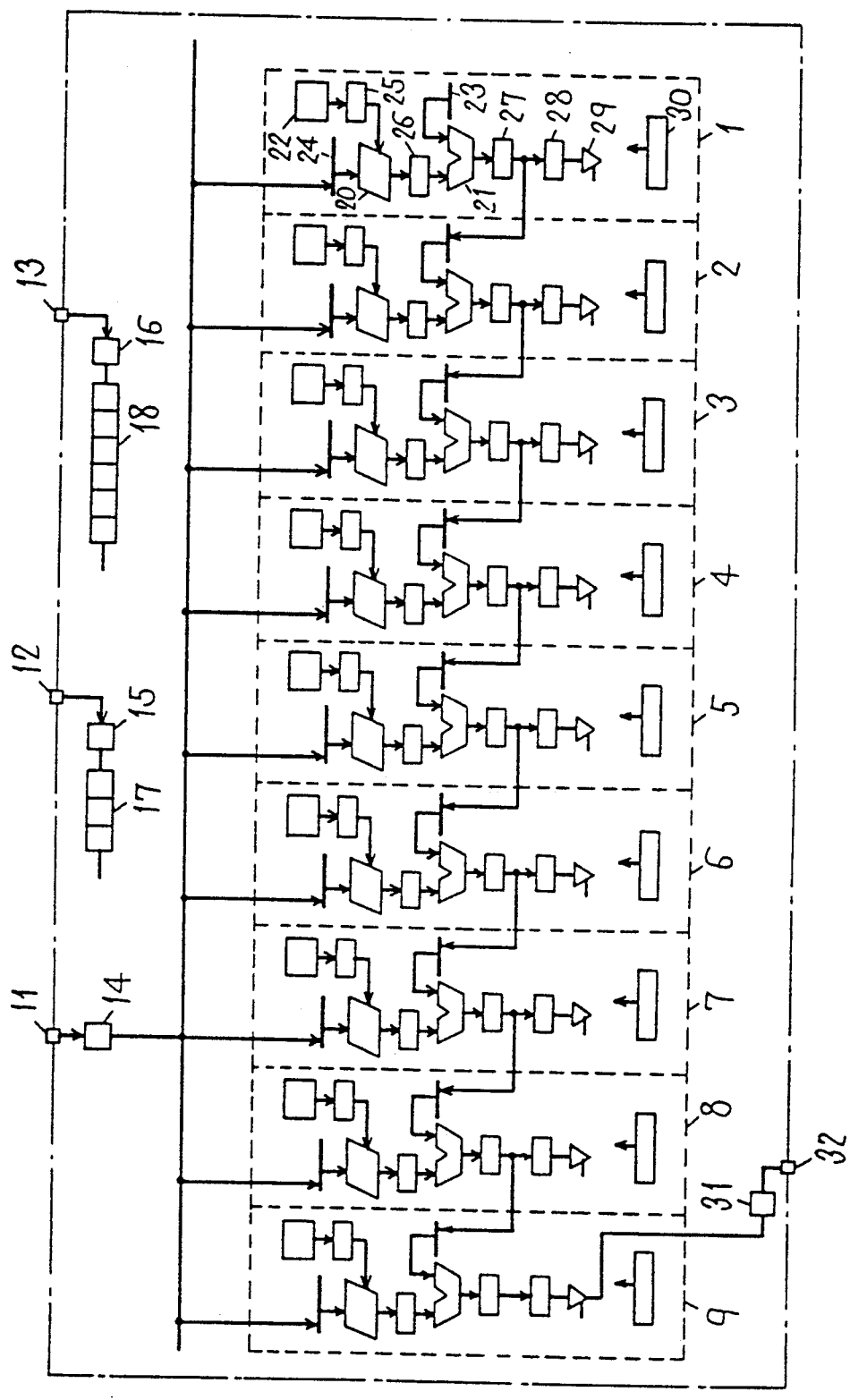
FIG. 2 is a construction block diagram for explaining the operation for applying the same system into a one-dimensional filter.

The parallel operator composed of plural multiplier/accumulator sets 1 to 9 of the present invention operates as a pipeline operator capable of changing over the data paths by controlling in each of the multiplier/accumulator sets 1 to 9 the selection state of the selectors 23, 24 and the switching of the output circuit 29 by the control circuit 30. By the change over of the data paths, the convolution operation and matrix operation for the filtering and the DCT mentioned in the prior art may be executed at a high speed by the pipeline structure. To explain the operation when applied in the filter or DCT, FIG. 1 is modified in FIG. 2 to 4, by deleting the data paths that are not activated by the selectors 23, 24 and output circuit 29 in FIG. 1 and illustrating only the effective data paths. FIG. 2 is a construction block diagram showing only the data paths necessary in the operation when applied as a one-dimensional filter, FIG. 3 when applied as a two-dimensional filter, and FIG. 4 when applied as a DCT.

FIG. 2 is an example of the use of the present invention as a one-dimensional 9-tap filter. In this case, the selector 24 of each of the multiplier/accumulator sets 1 to 9 selects the data from same input port 11. The selector 23 of each of the multiplier/accumulator sets 2 to 9 is controlled so as to select the data of the register 27 in each of the lower rank multiplier/accumulator sets 1 to 8. However, the selector 23 of the lowest rank multiplier/accumulator 1 selects zero. Only the output circuit 11 of the highest rank multiplier/accumulator 9 is opened, from which the output is taken out.

In this construction, one weighting coefficient of the filter is assigned to each memory 22. That is, each one of the multiplier/accumulator sets 1 to 9 corresponds to one filter tap, and the input signal is weighted by a coefficient at each multiplier 20. The output of each multiplier 20 is once latched in the register 26, and is sent to the adder 21. The adders 21 are connected in cascade through registers 27, and are added up sequentially. That is, the operation of the one-dimensional filter as expressed in formula (1) is effected. Each constituent element operates in each clock, and an output is obtained at every input of the data after a specified delay by the pipelining.

A filter of less than 9 taps may be freely composed in a same manner. Alternately, when composing a filter of more than 9 taps, a plurality of the devices as shown in FIG. 1 may be used. In this case, the output of the lower rank device is entered to the adder 21 of the lowest rank multiplier/accumulator 1 in the higher rank device through the input port 11 and selector 23 of the higher rank device, and the higher rank device takes in the input data from the input port 12 or the input port 13, so that the delay due to data transfer from the lower to upper devices may be cancelled by the delay circuit 17 or delay circuit 18. Accordingly, the extension may be easily realized.

Figure 3:
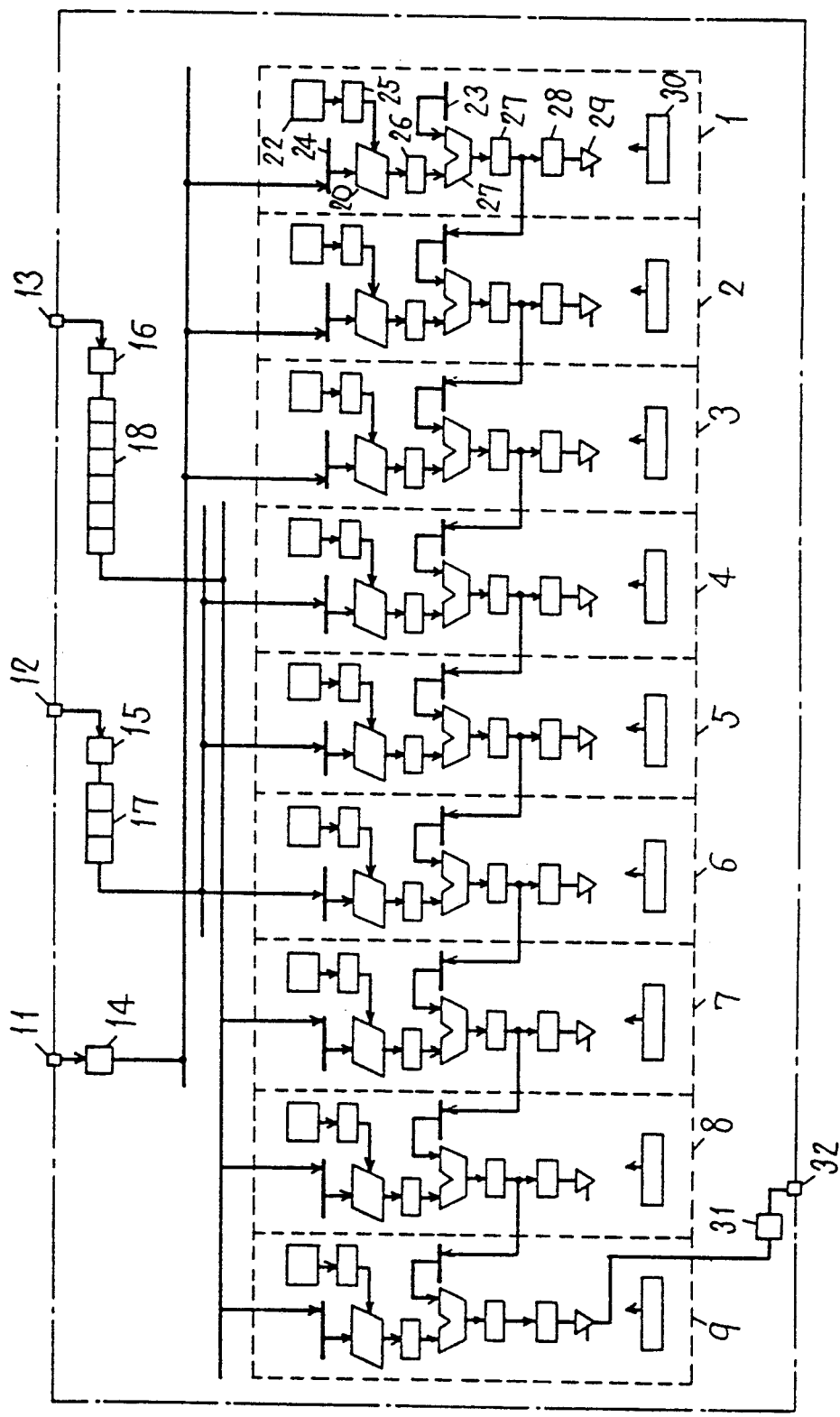
FIG. 3 is a construction block diagram for explaining the operation for applying the same system into a two-dimensional filter.

FIG. 3 is an example of the use of the present invention as a two-dimensional 3 by 3 tap filter. In this case, the input data for the portion of three lines are entered respectively from the three input ports 11, 12, 13. The data of the input port 11 is selected by the selector 24 of the multiplier/accumulator sets 1, 2, 3, the data of the input port 12 is selected by the selector 24 of the multiplier/accumulator sets 4, 5, 6, and the data of the input port 13 is selected by the selector 24 of the multiplier-/accumulator sets 7, 8, 9. The selector 23 of the multiplier/accumulator sets 1 to 9 select, as in the case of the one-dimensional filter, the data of the registers of the multiplier/accumulator 1 to 8, and only the output circuit 11 of the highest rank multiplier/accumulator 9 is opened.

When composed as in FIG. 3 as a two-dimensional 3 by 3 tap filter, the two-dimensional data is transformed into one-dimensional data spuriously by the delay circuits 17, 18, and calculation is possible using the same technique as in the one-dimensional filter, and the formula (2) is calculated at high speed by pipelining.

The two-dimensional filter may be extended in the same manner as the one-dimensional filter by transforming the two-dimensional data into one-dimensional data as stated above.

Figure 4:
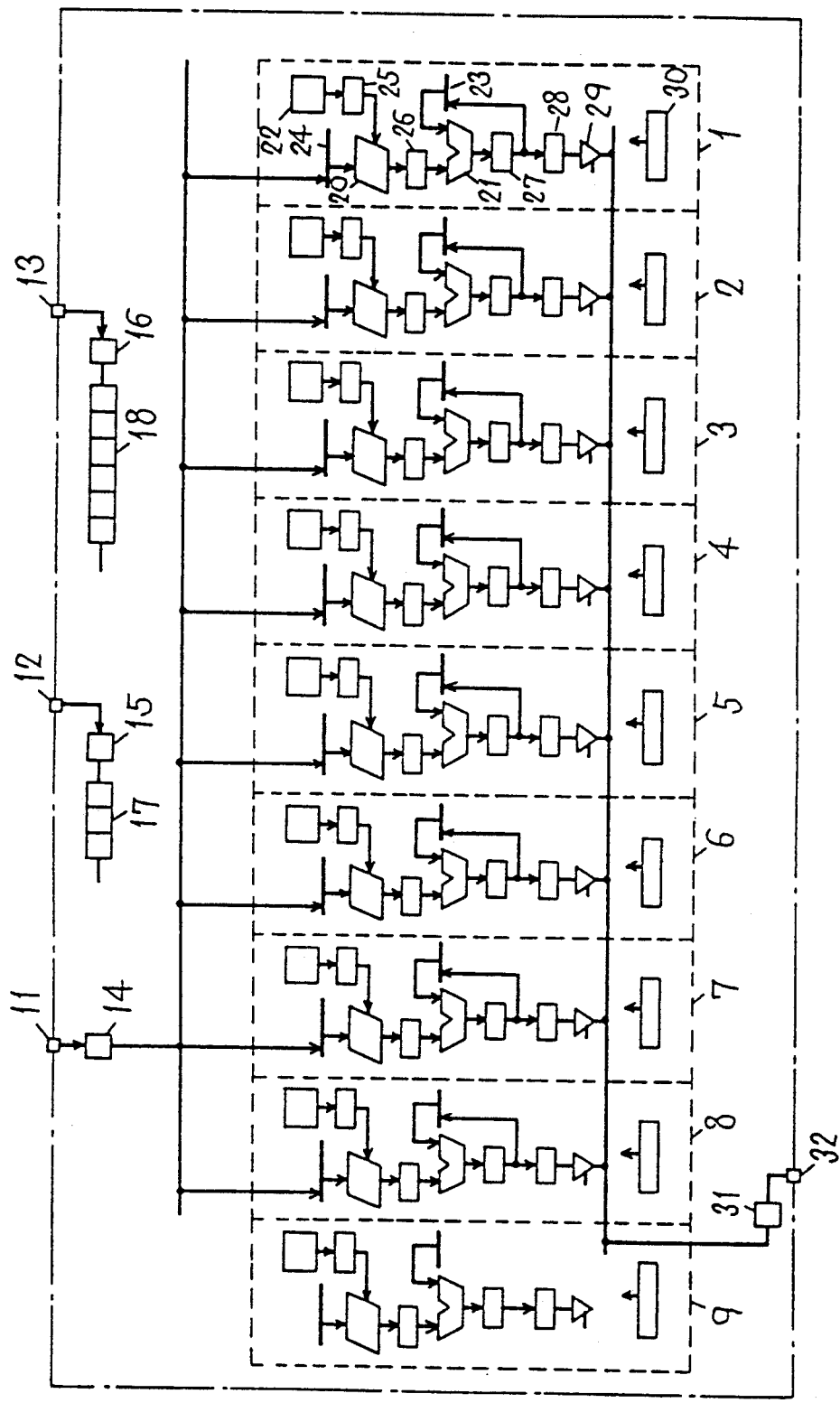
FIG. 4 is a construction block diagram for explaining the operation for applying the same system into a DCT.

FIG. 4 denotes an example of the use of the presentation as a one-dimensional 8 tap DCT. In this case, eight sets of multiplier/accumulator 1 to 8 are used, and the matrix operation of formula (3) is calculated. The selector 24 of each multiplier/accumulator set 1 to 8 selects the data from the input port 11, and the selector 23 selects the data of the register 27 in the same multiplier-/accumulator 1 to 8, thereby being composed like an ordinary accumulator. In the memory 22 of each multiplier/accumulator 1 to 8, the matrix coefficients of the DCT are divided and stored, and the multipliers/accumulators 1 to 8 execute simultaneously in charge of each row of the matrix operation. The computed results obtained simultaneously are respectively stored in the registers 28, and are sequentially output by sequentially opening the output circuits 29. Since the registers 28 are provided, computation and data output can be effected at the same time, and the pipeline processing is realized.

For extension of the DCT, a plurality of the devices are used, and realization may be easily effected by controlling the switching of the output circuits 29 depending on the number of extended taps.

Figure 5:
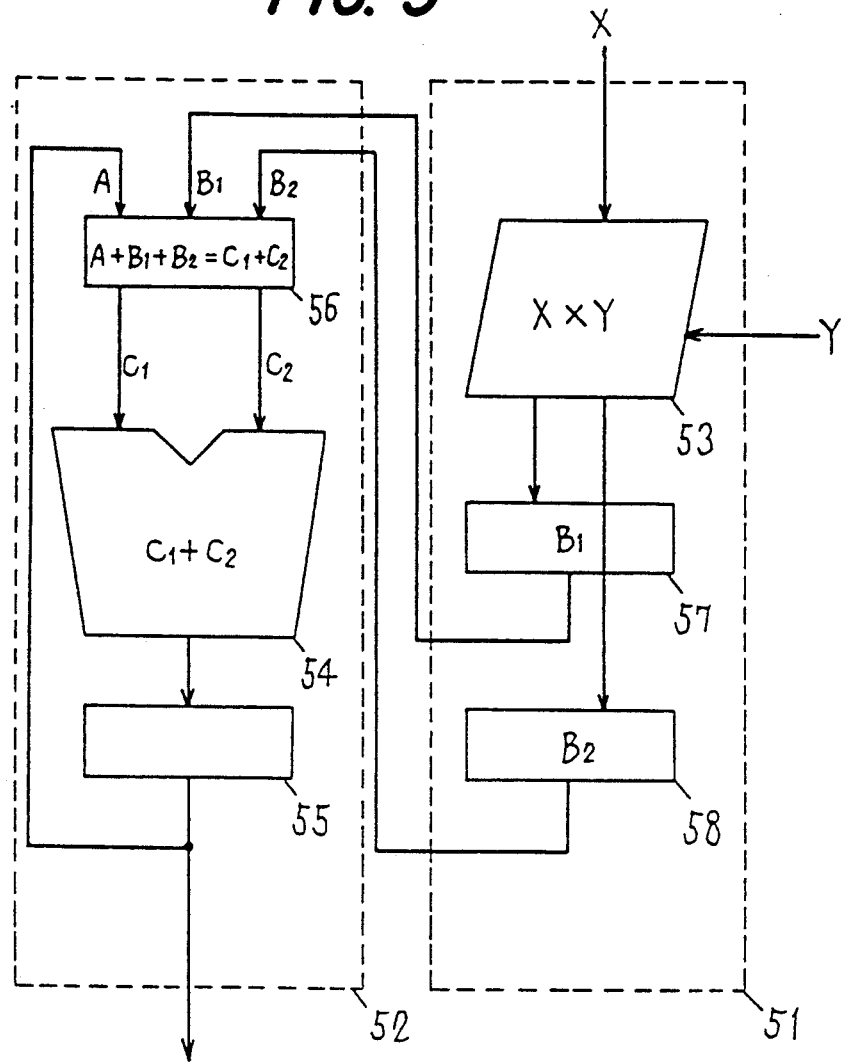
FIG. 5 is a block diagram of a multiplier/accumulator of this invention.

FIG. 5 relates to another embodiment of multipliers-/accumulators used in the digital signal processing apparatus of the present invention, in which a multiplication part 51 and an addition part 52 are coupled together using the data B1, B2 of the pipeline registers 57, 58 to make up the multiplier/accumulator.

In FIG. 5, at the multiplication part 51, multiplication of input data X and Y is effected at a multiplier 53, but this operation is not carried out until the end, and as the intermediate data, the data form of B1, B2 shown in formula (4)

$$X \times Y = B1 + B2 \qquad (4)$$

is stored in the pipeline registers 57, 58.

At the addition part 52, the data of the three inputs of the data A of the register 55 and data B1 and B2 is added together and transformed into C1 and C2 data as shown in formula (5)

$$B1 + B2 + A = C1 + C2 \qquad (5)$$

by the transformer 56. The transformer 56 is realized by the Wallace tree method, and transformation from three inputs into two inputs is realized by the delay of one gate of a full adder.

The transformed data C1 and C2 are added in the adder 54, and the sum data A is stored in the register 55.

This example represents a case of composing the pipeline by dividing the multiplier/accumulator into the multiplication part and addition part, and furthermore by storing the intermediate outputs of the multiplication part into the pipeline registers and performing the subsequent operation in the addition part. The operation speed of the multiplication part and addition part may be equalized, and a high speed multiplier/accumulator may be realized without being limited by the multiplier which generally has a long operation time.

In the multiplier/accumulator in FIG. 5, meanwhile, two sets of output intermediate data of the multiplier 53 are used, but it is evident that as many of the data may be used as desired depending on the speed balance design.

Figure 6:
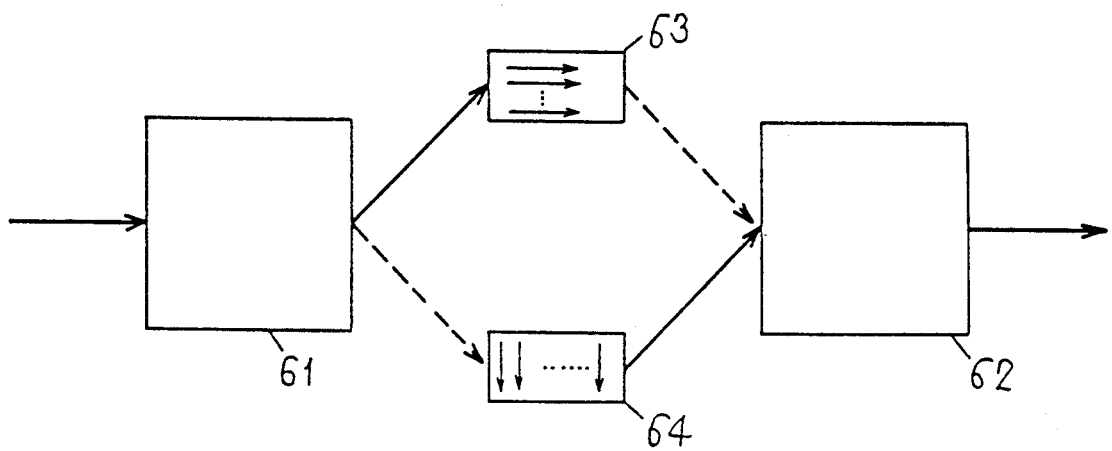
FIG. 6 is a block diagram of a two-dimensional orthogonal transformer of this invention.

FIG. 6 relates to an embodiment of applying the digital signal processing system of the present invention as a two-dimensional orthogonal transform, in which reference numerals 61, 62 denote one-dimensional orthogonal transformers explained with reference to FIG. 4, and reference numerals 63, 64 denote buffer memories.

It is stated above that a two-dimensional orthogonal transform is realized by applying a one-dimensional orthogonal transform twice, once in the vertical direction and once in the lateral direction. However, to access the data in both the vertical direction and lateral direction, it is difficult to connect the one-dimensional orthogonal transformers 61, 62 directly, and an intervening memory is needed. In this case, if there is only one buffer memory, writing of output data of the one-dimensional orthogonal transformer in the front stage, and reading into the one-dimensional orthogonal transformer in the rear state cannot be accomplished at the same time, and therefore, the processing of one must be stopped until the processing of the other is finished.

To eliminate such inconvenience, as shown in FIG. 6, two buffer memories 63, 64 are used. One buffer memory is used for the writing of output data of the one-dimensional orthogonal transformer in the front state, and the other buffer memory is used for the reading of data into the one-dimensional orthogonal transformer in the rear stage.

According to this constitution of FIG. 6, each time the processing of a unit data block is completed, the roles of the buffer memories 63, 64 are changed over, so that the memory bus-neck of the two-dimensional transformer shown in FIG. 6 may be eliminated, and so that the operation is continuous. Therefore, a two-dimensional orthogonal transform is realized at twice the operating speed of the prior art.

What we claim is:

1. A digital signal processing system comprising:
   a plurality of multiplier/accumulator means connected in parallel for executing a pipeline processing operation, each of said plurality of multiplier/accumulator means having a multiplication part and an addition part, said multiplication part and said addition part having operation times which are nearly equalized with each other;

said multiplication part comprising a multiplier for receiving first and second multiplication inputs and generating first and second intermediate outputs having a sum corresponding to a product of said first and second multiplication inputs and two pipeline registers for respectively storing said first and second intermediate outputs of said multiplier;

said addition part comprising a Wallace tree transformation means for transforming a sum of three inputs into two transformation outputs, an adder means for adding said two transformation outputs into one addition output, and an accumulator register for storing said one addition output, said three inputs including said two intermediate outputs stored in and received from said two pipeline registers and as one addition input an output from said accumulator register in one of said plurality of multiplier/accumulator means.

2. A digital processing system as recited in claim 1, further comprising:

a plurality of processor elements each comprising (a) first and second inputs, (b) first and second outputs, (c) a RAM having coefficients stored therein, (d) a respective one of said multiplier/accumulator means having as said first and second multiplication inputs said first input and a coefficient from said RAM and having as said one addition input an output of a multiplexer, (e) said multiplexer having as inputs said second input and an output of said accumulator register of said multiplier accumulator means having an output coupled to said first output, and (f) a buffer register having as an input said output of said accumulator register and having an output coupled to said second output;

an output multiplexer having as inputs said second output of each of said plurality of processor elements for selecting one of said second outputs of said plurality of processor elements;

an input port coupled to said first input of each of said plurality of processor elements;

said first output of a (m-1)th processor element being coupled to said second input of said mth processor element, m being a positive integer greater than 1;

said second input of a first processor element having input thereto a value 0; and, each of said multiplexers of said processor elements and said output multiplexer being controlled for one of a convolution operation and a matrix calculation.

3. A digital processing system as recited in claim 1, further comprising:

M processor elements each comprising (a) plural inputs, (b) first and second outputs, (c) a first multiplexer having as inputs said plural inputs, (d) a RAM having coefficients stored therein, (e) a respective one of said multiplier/accumulator means having as said first and second multiplication inputs an output of said first multiplexer and a coefficient from said RAM and as said one addition input an output of a second multiplexer, (f) said second multiplexer having as inputs one of said plural inputs and an output of said accumulator register of said multiplier/accumulator means having an output coupled to said first output, and (g) a buffer register having as an input and output of said accumulator register and having an output coupled to said second output, M being a positive integer greater than one;

an output multiplexer having as inputs said second outputs of each of said M processor elements for selecting one of said second outputs of said M processing elements;

plural input ports coupled to said plural inputs of said M processor elements;

said first output of a (m-1)th processor element being connected to said one of said plural inputs of a mth processor element, m being an integer wherein $2<m<M$;

said one of said plural inputs of a first processor element having input thereto a value 0; and each of said first and second multiplexers of said processor elements being controlled for one of a convolution operation and matrix calculation.

4. A multiplier/accumulator having a pipeline configuration for a data processing system comprising:

a multiplication part and an addition part, said multiplication part and said addition part having operation times which are nearly equalized with each other;

said multiplication part comprising a multiplier for receiving first and second multiplication inputs and generating first and second intermediate outputs having a sum corresponding to a product of said first and second multiplication inputs and two pipeline registers for respectively storing said first and second intermediate outputs of said multiplier;

said addition part comprising a Wallace tree transformation means for transforming a sum of three inputs into two transformation outputs, an adder means for adding said two transformation outputs into one addition output, and an accumulator register for storing said one addition output, said three inputs including said two intermediate outputs stored in and received from said two pipeline registers and as one addition input an output from said accumulator register.

* * * * *